United States Patent [19]

Graas

[11] Patent Number: 4,667,717
[45] Date of Patent: May 26, 1987

[54] PNEUMATIC TIRE

[75] Inventor: Maurice Graas, Luxembourg, Luxembourg

[73] Assignee: The Goodyear Tire & Rubber Company, Akron, Ohio

[21] Appl. No.: 745,458

[22] Filed: Jun. 17, 1985

[30] Foreign Application Priority Data

Aug. 28, 1984 [EP] European Pat. Off. ........ 84630123.2

[51] Int. Cl.$^4$ ..................... B60C 11/06; B60C 11/08
[52] U.S. Cl. ..................... 152/209 A; 152/209 B; 152/209 D; 152/560; D12/151
[58] Field of Search .......... 152/209 R, 209 D, 209 A, 152/209 B, 209 NT, 209 WT, 450, 455, 456, 560; D12/149, 151, 147

[56] References Cited

U.S. PATENT DOCUMENTS 2,971,552 2/1961 Williams et al. ................ 152/209 R
4,057,089 11/1977 Johannsen ..................... 152/209 R

FOREIGN PATENT DOCUMENTS 20360 10/1940 Australia .

Primary Examiner—David Simmons
Assistant Examiner—Thomas Bokan
Attorney, Agent, or Firm—L. R. Drayer; Charles Smith

[57] ABSTRACT

A directional tire (10) having lateral grooves (15,16) arranged in substantially "V" shaped configurations around the tire. The lateral grooves (15,16) on each side of the mid-circumferential plane (M—M) form a series of circumferentially spaced lands (25,26) respectively therebetween, each of which extends from a mid-circumferential portion of the tire to the respective edge of the tread (12 or 13). Each land (25,26) has a first face (27) directed in one rotational direction and a second face (28) directed in the other rotational direction. In order to modify the directional properties of the tire one of said faces, preferably the trailing face (28) in normal use, is broken by axially extending grooves (31,32 and 33).

8 Claims, 5 Drawing Figures

PNEUMATIC TIRE

BACKGROUND OF INVENTION

This invention relates generally to pneumatic tires for passenger cars and more particularly to tires for use on high performance vehicles.

A modern trend is for the tread pattern, formed by grooves and lands in the ground contacting tread portion of a tire to be directional. A directional tire is a tire having a tread pattern such that when the tire is rotated in one direction it has different tractional properties with the ground than when it is rotated in the other direction. A typical directional tread pattern has lateral grooves that are arranged to form a series of "V" shaped grooves all pointed in the same direction around the tire tread. Usually for maximum traction grip during acceleration of high performance cars the "V" shaped grooves are pointed in the direction of travel, so that the mid portion of each "V" shaped groove will enter the footprint of the tire first.

Typical examples of this type of tire are illustrated in European Patent Application No. 0 064 934 A, British Patent Application No. GB 2 046 188 A, and U.S. Pat. No. 4,057,089.

The differences in the tractional properties between the two directions of rotation can be varied by a number of different design parameters, for example the angle of the "V" shaped grooves make relative to the mid-circumferential plane of the tire, the circumferential spacing between the "V" shaped grooves, and the land-to-sea ratio of the tread.

The present invention provides a directional tire in which the tractional properties between the two directions of rotation can be varied by an alternative parameter.

SUMMARY OF INVENTION

According to the invention there is provided a pneumatic tire comprising a ground contacting tread portion with a pair of lateral edges and a mid-circumferential portion, the tread portion having a directional tread pattern therein including lateral grooves extending from the mid-circumferential portion towards both lateral edges, all of the lateral grooves extending in the same circumferential direction and forming circumferentially spaced lands therebetween, each of said lands extending continuously from the mid-circumferential portion to a respective lateral edge and having a first face directed in one rotational direction, said first face being continuous from the mid-circumferential portion to the respective lateral edge, and said second face being broken by axially spaced circumferentially extending grooves.

Preferably, the circumferentially extending grooves are in the trailing face of the land when the tire is rotated in a direction for forward movement of the vehicle.

It is preferable for the lateral grooves on each side of the mid-circumferential plane to be of a curved configuration, and to make an overall angle of about 55°–70° with respect to the mid-circumferential plane of the tire.

DESCRIPTION OF THE DRAWINGS

The invention will be described by way of example of and with reference to the accompanying drawings in which.

DETAILED DESCRIPTION OF THE INVENTION

Figure 1:
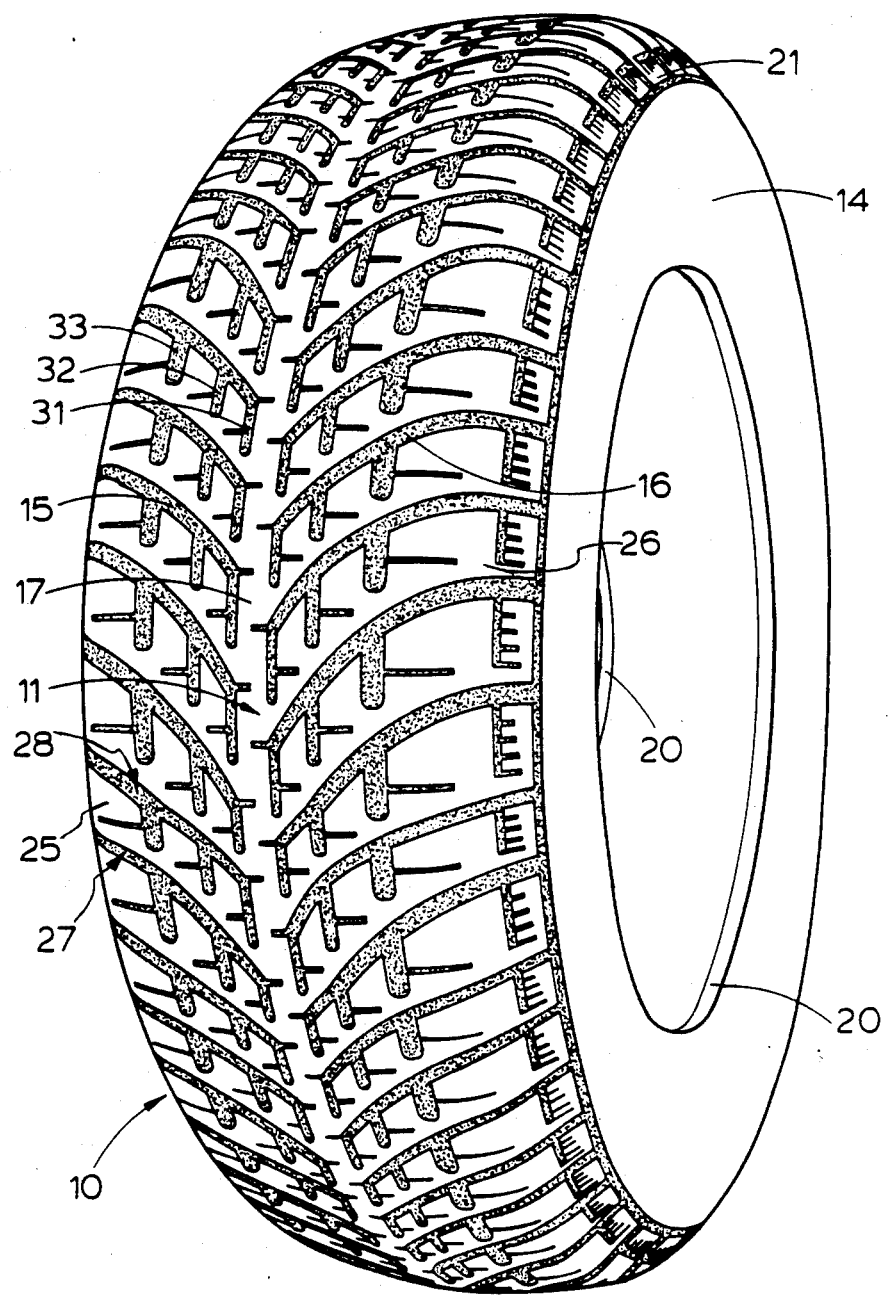
FIG. 1 is a perspective view of a tire according to the invention.
Figure 2:
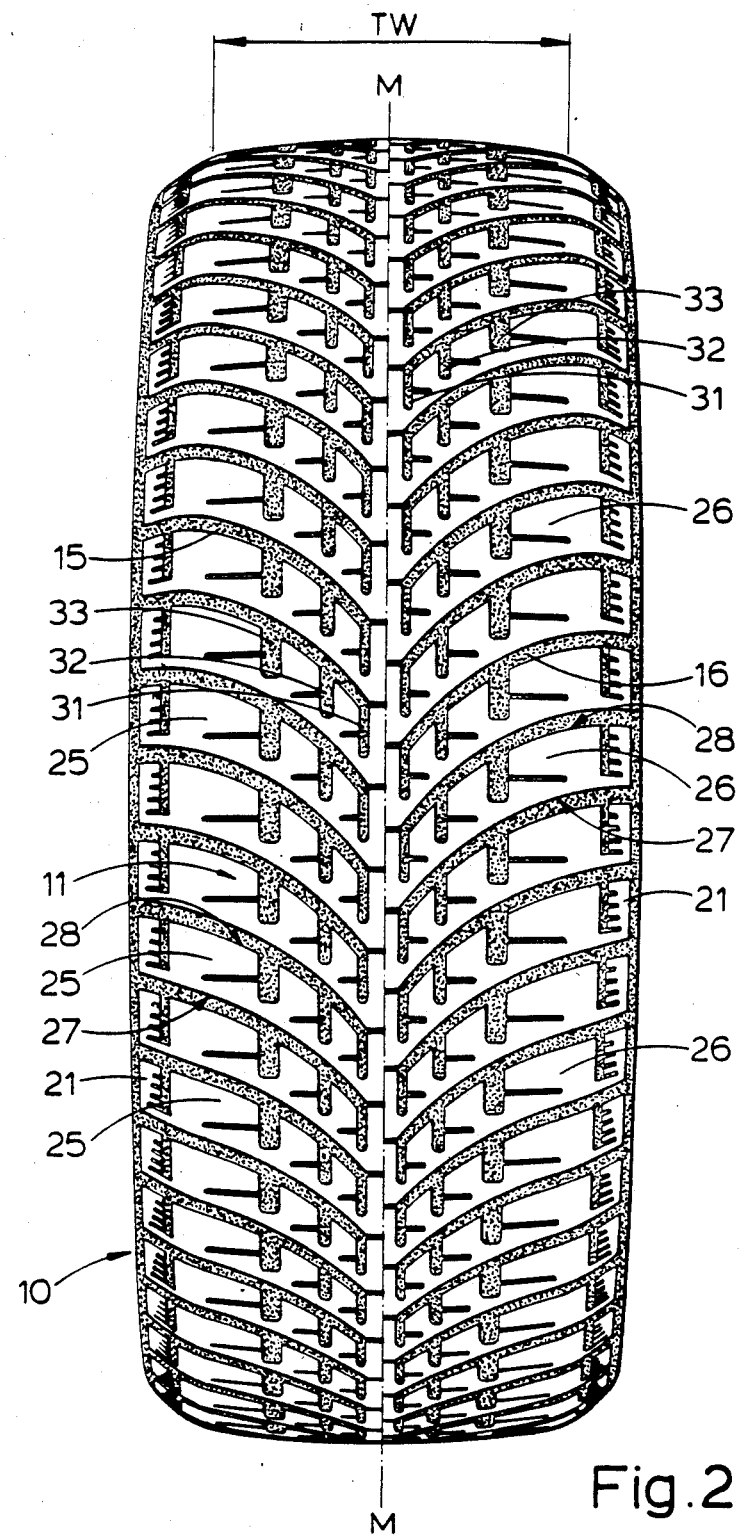
FIG. 2 is a front elevation of the tire illustrated in FIG. 1.
Figure 3:
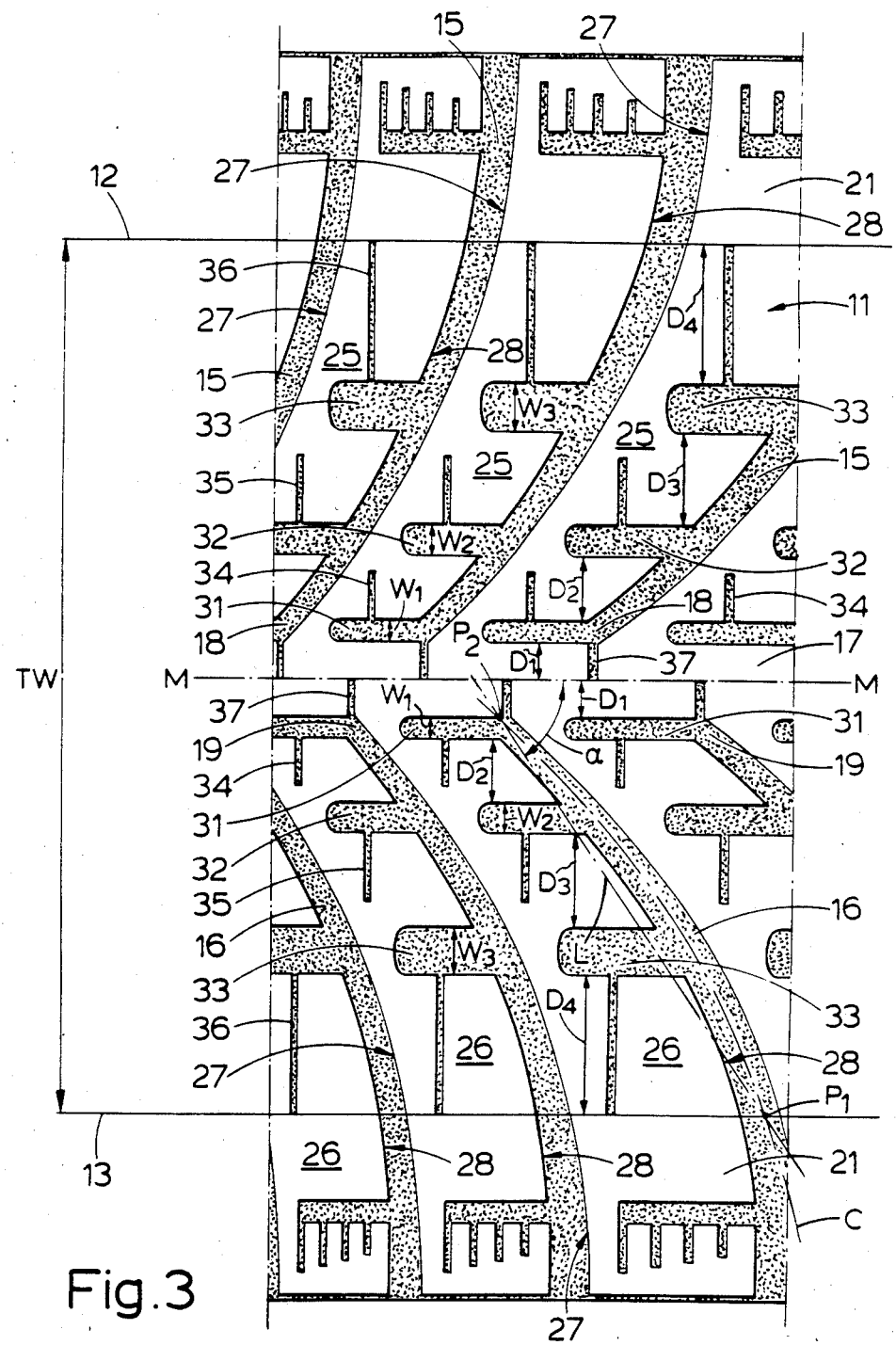
FIG. 3 is a fragmentary enlarged plan view of the tread portion of the tire illustrated in FIGS. 1 and 2.

With reference to FIG. 1, FIG. 2 and FIG. 3, there is illustrated a pneumatic tire 10 for a passenger car and in particular for a car that is to be driven at high speeds on either roads or racing circuits. The tire 10 is of radial carcass construction and has a ground contacting tread portion 11 with a pair of lateral edges 12 and 13 spaced apart by a tread width TW. For the purposes of this invention the tread width TW is defined as the greatest axial distance across the tire as measured from the footprint of the tire when the tire is mounted on a specified rim and is inflated to a design pressure at a rated load, and the terms "axial" and "axially" refer to distances along or parallel with the axis of rotation of the tire. The tread portion 11 is joined at its lateral edges 12 and 13 to a pair of shoulder portions 21 which extend into the sidewalls 14. Each sidewall 14 extends radially inwardly from a respective shoulder portion 21 and each terminates in a bead portion 20.

The tire 10 has a mid-circumferential plane M—M perpendicular to the axis of rotation of the tire and located midway between the lateral edges. The tread portion 11 has a directional tread pattern therein including lateral grooves 15 and 16 on each side of the mid-circumferential plane M—M. The lateral grooves 15 and 16 extend from a mid-circumferential portion 17, symmetrically located on each side of the plane M—M, towards a respective lateral edge 12 or 13. By mid-circumferential portion of the tread is meant up to 15% of the tread width TW on each side of the plane M—M. Each lateral groove 15 or 16 has its axially innermost end 18 or 19 respectively located at approximately 4% to 5% of the tread width TW from the plane M—M, and each lateral groove 15 or 16 extends axially outwardly and circumferentially in a curve to the respective tread edge 12 or 13 and into the adjacent shoulder 21. The lateral grooves 15 on one side of the plane M—M extend circumferentially in the same direction of rotation as the lateral grooves 16 on the other side of the plane so that in appearance the two sets of lateral grooves 15 and 16 form a series of approximately "V" shaped configurations that are circumferentially spaced around the tread. The curve of each lateral groove is such that, the included angle between tangents to the curve and the mid-circumferential plane, increase as the distance from the point of tangency to the mid-circumferential plane increases. Each lateral groove 15 or 16 makes an overall angle $\alpha$ with respect to the mid-circumferential plane M—M of the tire of between 55° and 70°. The overall angle $\alpha$ is measured between the plane M—M and a straight line L drawn between a first point $P_1$ at the intersection of the lateral edge of the tread and the center-line C of the respective groove, and a second point $P_2$ at the intersection of said center-line C and the respective axially inner end 18 or 19 of the groove. The lateral grooves 15 to one side of the plane M—M are circumferentially off-set from the grooves 16 on the other side of the plane M—M by a circumferential distance on one half (½) the pitch between adjacent lateral grooves.

The lateral grooves 15 and 16 on each side of the plane M—M form circumferentially spaced lands, 25 and 26 respectively, therebetween. Each land 25, 26 extends continuously from the mid-circumferential portion 17 of the tread to a respective lateral edge. The lands 25, 26, each have a first face 27 directed in one direction of rotation of the tire and a second face 28 directed in the other direction of rotation of the tire. Because the tire is directional it is expected that when the tire is mounted on a vehicle, for forward movement the tire rotates so that the apex of the "V" configuration enters the footprint of the tire first. Hence, in this particular use of the tire, the first faces 27 are the leading faces of the lands 25, 26 and the second faces 28 are the trailing faces of the lands.

The leading faces 27 are continuous curved surfaces extending from the mid-circumferential portion 17 to the respective tread edge 12 or 13. The trailing faces 28 are also arcuate surfaces but are non-continuous in that each surface 28 is interrupted by three circumferentially extending grooves 31,32, and 33 which extend from the trailing face 28 of each land towards the leading face 27. The circumferentially extending grooves 31,32, and 33 increase in their respective axial widths $W_1$, $W_2$ and $W_3$ in stepwise progression axially outwardly from the mid-circumferential plane M—M, and each circumferential groove extends across its respective land 26 for between 70% to 80% of the circumferential length of the land. The axial widths $W_1$, $W_2$, and $W_3$ are related in that $W_3$ is approximately equal to 2.2 $W_1$, and $W_2$ is approximately equal to 1.4 $W_1$.

The circumferentially extending grooves 31,32, and 33 in each land 25 or 26 are axially aligned on each side of the plane M—M, so that the grooves 31,32, and 33 lie on respective straight axially spaced circular paths around the tread on each side of the plane M—M. The axially inner circumferential grooves 31 are all located at a distance $D_1$ from the plane M—M, the distance $D_1$ being approximately 4% of the tread width TW. The distance $D_2$ between the circumferentially extending grooves 31 and the adjacent axially outer circumferentially extending grooves 32 is approximately equal to 1.7 $D_1$, the distance $D_3$ between the circumferential grooves 32 and the adjacent axially outer grooves 33 is approximately equal to 2.5 $D_1$, and the distance $D_4$ between the circumferentially extending grooves 33 and the respective lateral edge of the tread is approximately 4.5 $D_1$. Thus it can be seen that as the distances $D_1$, $D_2$, $D_3$ and $D_4$ increase in stepwise progression axially outwardly from the center plane M—M, so do the axial widths $W_1$, $W_2$, and $W_3$ of the circumferential grooves 31,32, and 33 respectively. This maintains a reasonably constant "land-to-sea" ratio across the tire, that is the contact area of the tread relative to the groove area.

The circumferentially extending grooves 31,32 and 33 each have a blade 34,35 and 36 respectively, extending axially outwardly from the groove for a distance which is at least twice the width of the respective groove from which it extends. For the purposes of this invention a blade (sometimes called a sipe) is a narrow groove which closes in the footprint of the tire. Each blade 34,35, or 36 is located at mid-length position along the respective groove 31,32 or 33. The axially inner circumferential groove 31 also has an additional blade 37 which extends axially inwards from the mouth of the groove 31 to the plane M—M.

Because the lands 25,26 have a continuous leading face 27 and a broken, or discontinuous, trailing face 28 the traction grip of the tire on a driving surface is further modified in the forward direction relative to the reverse direction. This is because the continuous leading face 27 provides a continuous edge for contact with the ground as compared with the more flexible broken trailing face 28.

During braking the trailing faces 28 are loaded and distort in a circumferential direction until the blades 34,35, and 36 close up, at which point the continuous margin of axially extending land adjacent the leading faces 27 of each land helps to support the trailing face 28. This also has a further advantage of allowing the lateral grooves 15,16 to slightly open during braking which is good for the removal of water from the tread area.

Figure 4:
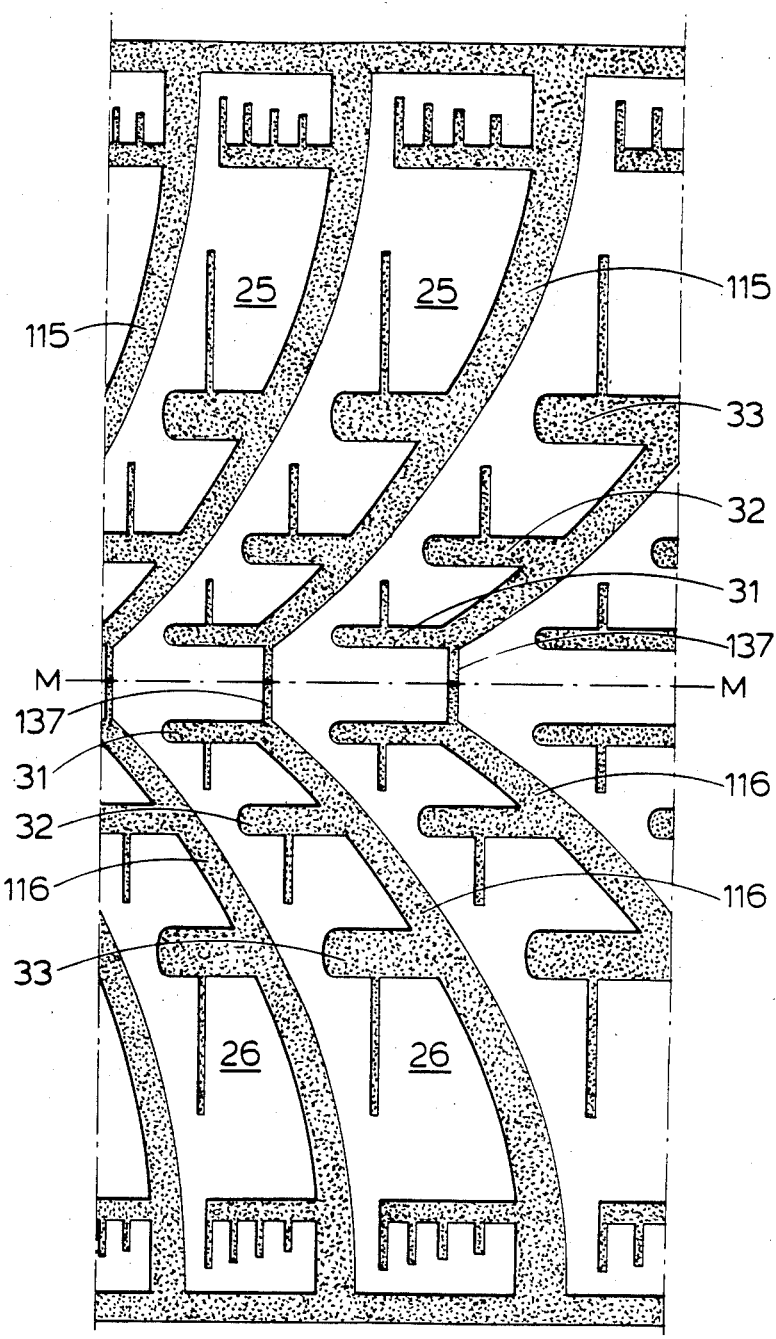
FIG. 4 is a fragmentary enlarged plan view of the tread portion of a second tire according to this invention.

In FIG. 4 there is illustrated a fragmentary plan view of the tread portion of a tire. The tread portion illustrated differs from that shown in FIGS. 1-3 in that the lateral grooves 115 and 116 are not circumferentially staggered as previously described but are aligned one with the other to give a more true "V" shape configuration. As a consequence of the alignment of the lateral grooves 115 and 116, the blades 137 extending from the mouth of the axially inner circumferential grooves 131 join each other, thereby linking each lateral groove 115 on one side of the plane M—M with it aligned neighboring groove 116 on the other side of the plane. In all other essential matters the tread portion of FIG. 4 is the same as the tread illustrated in FIGS. 1-3.

Figure 5:
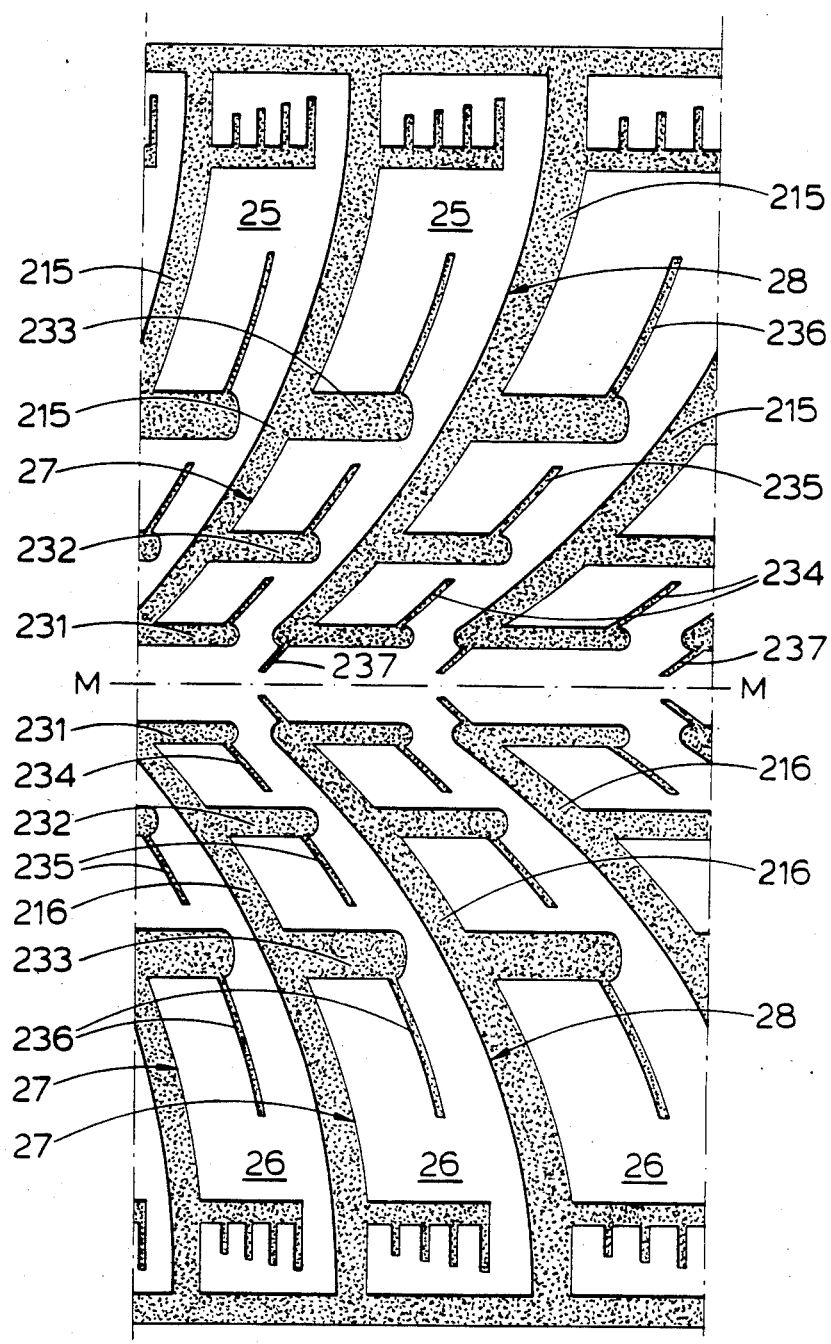
FIG. 5 is a fragmentary enlarged plan view of the tread portion of yet another tire according to this invention.

FIG. 5 illustrates yet another embodiment of the invention. The tread portion is similar to that illustrated in FIG. 4. The lateral grooves 215 and 216 are aligned as in FIG. 4, but there are two major differences in the tread. When the tire is mounted on a vehicle it is expected that the tire will rotate for forward movement so that the apex of the "V" enters the footprint first and in this case the leading faces 27 of the lands 25 and 26 are made non-continuous, or broken, and the trailing faces 28 are continuous. This is the opposite of the tire illustrated in FIGS. 3 and 4.

The leading faces 27 of the lands are interrupted by circumferentially extending grooves 231,232, and 233. The dimensions and axial locations of these grooves 231,232, and 233 are essentially as for the grooves 31,32, and 33 as described with reference to FIGS. 1-3 excepting that they extend from the leading face 27 towards the trailing face 28.

The blades 234,235, and 236, extending axially from the circumferentially extending grooves, do so in a direction generally parallel to the respective lateral grooves 215 or 216. The blades 234,235 and 236 are also located adjacent the end of each respective groove. Similarly the blades 237 in the mid-circumferential portion 17 are formed along the directional path of the lateral grooves 215 and 216.

Because the leading faces 27 of the lands 25 and 26 are interrupted by the circumferentially extending grooves 231,232, and 233, while the trailing face 28 is continuous, the traction grip of the tire on a driving surface is modified relative to the traction grip in the reverse direction of rotation so as to provide a different effect from the embodiment shown in FIG. 1.

It is also envisaged that the present invention is applicable to directional tires which are to be mounted on a vehicle so that the side portions of the "V" shaped grooves enter the footprint first during forward movement of the vehicle.

While certain representative embodiments and details have been shown for the purpose of illustrating the invention it will be apparent to those skilled in the art that various modifications could be made without departing from the scope of the invention. For example, the blades 34,35,36 and 37 shown in FIG. 3 could be omitted or could be altered in direction to resemble the blades in FIG. 5. Furthermore the lateral grooves could be straight and not curved and could also be varied in the angle they make with the mid-circumferential plane.

I claim:

1. A pneumatic tire comprising a ground contacting tread portion with a pair of lateral edges and a mid-circumferential portion, said tread portion having a directional tread pattern therein including two sets of curved lateral grooves, each lateral groove making an included overall angle with respect to the mid-circumferential plane of between 55° and 70° each set being on one side only of the mid-circumferential plane of the tire, said lateral grooves extending from the mid-circumferential portion of the tread towards both lateral edges of the tread with all of the lateral grooves on one side of the mid-circumferential plane extending circumferentially in the same direction of rotation as the lateral grooves on the other side of said plane so that in appearance the two sets of lateral grooves form a series of approximately V-shaped configurations spaced circumferentially around the tread, circumferentially spaced lands disposed between the lateral grooves extending continuously from the mid-circumferential portion of the tread to a respective lateral edge and having a first face directed in one direction of rotation of the tire and a second face directed in the other rotational direction, said first face being continuous and uninterrupted by any intersecting grooves or notches from said mid-circumferential portion to the respective lateral edge of the tread and said second face being broken by axially aligned spaced circumferentially extending grooves which lie on respective straight axially spaced circular paths around the tread.

2. A pneumatic tire as claimed in claim 1 wherein the curve of each lateral groove is such that the included angle between a tangent to the curve at any point along the curve and the mid-circumferential plane of the tire, increases with the axial distance from the point of tangency to the mid-circumferential plane increases.

3. A pneumatic tire as claimed in claim 1 wherein the axial widths of the circumferentially extending grooves increases in stepwise progression axially outwardly from the mid-circumferential plane of the tire.

4. A pneumatic tire as claimed in claim 3 wherein the axial spacing between adjacent circumferentially extending grooves in each land also increases in stepwise progression axially outwardly from said mid-circumferential plane.

5. A pneumatic tire as claimed in claim 3 wherein the axially spaced circumferentially extending grooves extend across the respective land by between 70% to 80% (seventy to eighty percent) of the circumferential width of said lands.

6. A pneumatic tire as claimed in claim 5 wherein the circumferentially extending grooves each have a blade extending therefrom in a generally axially outward direction across the respective land.

7. A pneumatic tire as claimed in claim 6 wherein each of said blades has a length which is at least twice the width of the groove from which it extends.

8. A pneumatic tire as claimed in claim 7 wherein the blades extend in a direction substantially parallel with the lateral grooves.

* * * * *